United States Patent
Palese

(10) Patent No.: US 6,570,704 B2
(45) Date of Patent: May 27, 2003

(54) HIGH AVERAGE POWER CHIRPED PULSE FIBER AMPLIFIER ARRAY

(75) Inventor: Stephen P. Palese, Torrance, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/808,330

(22) Filed: Mar. 14, 2001

(65) Prior Publication Data

US 2002/0131164 A1 Sep. 19, 2002

(51) Int. Cl.[7] .............................. H01S 3/00; H01S 3/30; H01S 3/13
(52) U.S. Cl. ...................... 359/349; 372/6; 372/29.011; 372/38.01
(58) Field of Search ....................... 359/341.41, 341.42, 359/341.4, 349, 341.1, 341.32, 341.33; 372/6, 18, 29.011, 38.01, 38.06, 70

(56) References Cited

U.S. PATENT DOCUMENTS

| | | | | |
|---|---|---|---|---|
| 4,472,053 A | * | 9/1984 | Wyatt et al. ................ | 356/121 |
| 4,757,268 A | * | 7/1988 | Abrams et al. ............. | 359/333 |
| 4,792,230 A | * | 12/1988 | Naganuma et al. ......... | 356/450 |
| 4,794,345 A | * | 12/1988 | Linford et al. .............. | 359/338 |
| 4,918,517 A | | 4/1990 | Burgoon ...................... | 358/101 |
| 4,922,480 A | * | 5/1990 | Bosch ......................... | 359/133 |
| 5,095,487 A | * | 3/1992 | Meyerhofer et al. ........ | 372/102 |
| 5,373,526 A | * | 12/1994 | Lam et al. ................... | 372/102 |
| 5,392,154 A | * | 2/1995 | Chang et al. ............... | 359/124 |

(List continued on next page.)

FOREIGN PATENT DOCUMENTS

| | | | |
|---|---|---|---|
| JP | 5-291544 | * | 11/1993 |
| JP | 2000-56280 | * | 2/2000 |

OTHER PUBLICATIONS

Shuman, T. M. et al. "Real–time measruement of ultrashort optical pulses using Spider." CLEO 1999, May 1999, pp. 533–534.*

Gallmann, L. et al. "Spatially resolved amplitude and phase characterization of ultrashort optical pulses using Spider." CLEO 2000, May 2000, pp. 583–584.*

Yeremenko, S. et al. "Phase Amplitude retrival: SHG Frog vs. Spider." CLEO 2000, May 2000, pp. 476–477.*

GAllmann, L et al. "Collinear type–II SHG–Frog pulse characterization in the sub–10–fs regime." CLEO 2000, May 2000, pp. 619–620.*

Dudley, J.M. et al. "Complete Characterization of Ultrashort Pulse Sources at 1550 nm." IEEE J. Quantum Elect. 35:4, Apr. 1999, pp. 441–450.*

Kane, Daniel J. "Recent Progress Twoard Real–Time Measurement of Ultrashort Laser Pulses." IEEE J. Quantum Elect. 35:4, Apr. 1999. pp. 421–431.*

Glas, P. et al. "Dynamic Characteristics of a Transient Phase–Coupled and Mode–Locked Fiber–Array Laser." IEEE J. Quantum Elect. 31:9, Sep. 1995, pp. 1619–1625.*

*Primary Examiner*—Thomas G. Black
*Assistant Examiner*—Andrew R. Sommer
(74) *Attorney, Agent, or Firm*—Harness, Dickey & Pierce, P.L.C.

(57) ABSTRACT

An apparatus is provided including a source of spectrally dispersed seed wavelengths optically coupled to an array of fibers. Laser diode pumps are optically coupled to the array of fibers for amplifying the wavelengths through the array. A computer controlled feedback loop intercouples the array of fibers and laser diode pumps, the source of seed wavelengths and/or phase modulators for maintaining the wavelengths and relative phases in the array of fibers to desired levels. A compressor is optically coupled to an end of the array of fibers so as to receive and overlap the wavelengths from the individual fibers of the array.

9 Claims, 4 Drawing Sheets

U.S. PATENT DOCUMENTS

| | | | |
|---|---|---|---|
| 5,400,350 A | * 3/1995 | Galvanauskas | 372/102 |
| 5,530,544 A | 6/1996 | Trebino et al. | 356/345 |
| 5,631,758 A | 5/1997 | Knox et al. | 359/127 |
| 5,696,782 A | * 12/1997 | Harter et al. | 372/102 |
| 5,729,369 A | * 3/1998 | Zirngibl | 359/110 |
| 5,754,292 A | * 5/1998 | Kane et al. | 356/450 |
| 5,805,759 A | * 9/1998 | Fukushima | 359/889 |
| 5,847,863 A | * 12/1998 | Galvanauskas et al. | 359/333 |
| 5,907,429 A | * 5/1999 | Sugata | 359/160 |
| 5,912,751 A | 6/1999 | Ford et al. | 359/128 |
| 5,978,119 A | * 11/1999 | Giles et al. | 359/127 |
| 6,025,911 A | * 2/2000 | Diddams et al. | 356/450 |
| 6,081,369 A | * 6/2000 | Waarts et al. | 359/341.33 |
| 6,181,463 B1 | * 1/2001 | Galvanauskas et al. | 359/330 |
| 6,198,568 B1 | * 3/2001 | Galvanauskas et al. | 359/332 |
| 6,200,309 B1 | * 3/2001 | Rice et al. | 372/3 |
| 6,219,360 B1 | * 4/2001 | Komine | 372/26 |
| 6,229,940 B1 | * 5/2001 | Rice et al. | 372/6 |
| 6,233,085 B1 | * 5/2001 | Johnson | 372/6 |
| 6,249,630 B1 | * 6/2001 | Stock et al. | 359/161 |
| 6,256,141 B1 | * 7/2001 | Kosaka | 359/124 |
| 6,256,328 B1 | * 7/2001 | Delfyett et al. | 372/18 |
| 6,281,471 B1 | * 8/2001 | Smart | 219/121.62 |
| 6,314,115 B1 | * 11/2001 | Delfyett et al. | 359/123 |
| 6,366,356 B1 | * 4/2002 | Brosnan et al. | 356/477 |
| 6,389,046 B1 | * 5/2002 | Stay et al. | 372/29.011 |
| 6,400,871 B1 | * 6/2002 | Minden | 372/6 |

* cited by examiner

HIGH AVERAGE POWER CHIRPED PULSE FIBER AMPLIFIER ARRAY

BACKGROUND OF THE INVENTION

1. Technical Field

The present invention generally relates to electrically driven solid state lasers and, more particularly, to an apparatus and method for producing high average power laser light from a distributed series of fiber amplifiers.

2. Discussion

Large scale electrically driven solid state lasers are currently used in numerous military and commercial applications. At power levels greater than 10 Watts (W), fiber lasers currently provide the most efficient generation of optical power from electrical sources with diffraction limited brightness. Unfortunately, individual fiber elements are currently limited to the 100 Watt level due to the small mode volume within the fiber.

To overcome the limitations of individual fiber elements, arrays of fibers are employed to generate multi-kilowatt or megawatt optical powers. There are currently two approaches of integrating fiber arrays into a unified coherent output. The first approach involves phasing individual fibers. The second approach involves wavelength division multiplexing.

While each of these approaches has merits, each also has disadvantages. As such, it would be desirable to provide an apparatus and method which combines these approaches so that either phasing, wavelength division multiplexing or both can be incorporated into an optical fiber array depending on the specific application. In addition, it would be desirable to provide a combined approach which allows the synthesis of coherent temporal wave forms of arbitrary shape.

SUMMARY OF THE INVENTION

The above and other objects are provided by an apparatus including a source of spectrally dispersed seed wavelengths optically coupled to an array of fibers. Diode pumps lasers are optically coupled to the array of fibers for amplifying the wavelengths through the array of fibers. A computer controlled feedback loop intercouples the array of fibers, the amplifier, the source of seed wavelengths, and/or phase modulators for maintaining the amplitude, phase and/or wavelengths in the array of fibers to desired levels. A compressor is optically coupled to an end of the array of fibers so as to receive and overlap the wavelengths from the individual fibers of the array.

In one embodiment of the present invention, the source of seed wavelengths comprises an array of wavelength controllable seed lasers. In another embodiment, the source of seed wavelengths comprises a short pulse laser and a stretcher which spatially separates the frequency components of the output of the short pulse laser. In yet another embodiment, the source of seed wavelengths includes a short pulse laser and a stretcher as well as a high speed phase modulator array and a low speed phase modulator array interposed between the stretcher and the array of fibers.

In still another embodiment of the present invention, the controlled feedback loop comprises a plurality of fiber taps optically coupled to the array of fibers for tapping wavelengths in the individual fibers of the array and a photodiode array optically coupled to the plurality of fiber taps for monitoring power levels in the individual fibers of the array.

In another embodiment, the control feedback loop comprises a plurality of fiber taps optically coupled to the array of fibers for tapping wavelengths in the individual fibers of the array and an imaging spectrometer optically coupled to the plurality of fiber taps for monitoring the power levels and, if desired, wavelengths in the individual fibers of the array. In yet another embodiment, the controlled feedback loop includes fiber taps and an imaging spectrometer as well as a shearing interferometer array and a non-linear crystal array interposed between the plurality of fiber taps and the spectrometer for monitoring the power level, wavelengths and phase in the fibers of the array.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards an apparatus and method for producing high average power laser light from a distributed series of fiber amplifiers, a fiber ribbon amplifier and/or photonic crystal waveguides. The invention employs wavelength distributed amplifiers which are utilized in telecommunication systems since both Ytterbium (YB) fiber (1030–1130 nanometer (nm)) and Erbium (Er) fiber (1510–1620 nm) systems are broad-band gain media. In addition, Yb based Raman fiber amplifiers can extend the effective amplification bandwidth from 1060–1580 nm. By injecting bandwidths into each fiber on the order of 0.02 nm, to avoid stimulated Brilluion Scattering (SBS) effects, approximately 15,000 fibers can be wavelength multiplexed over this extended wavelength range. This corresponds to 750 kW of output power for an array of 50 W fiber lasers.

Figure 1:
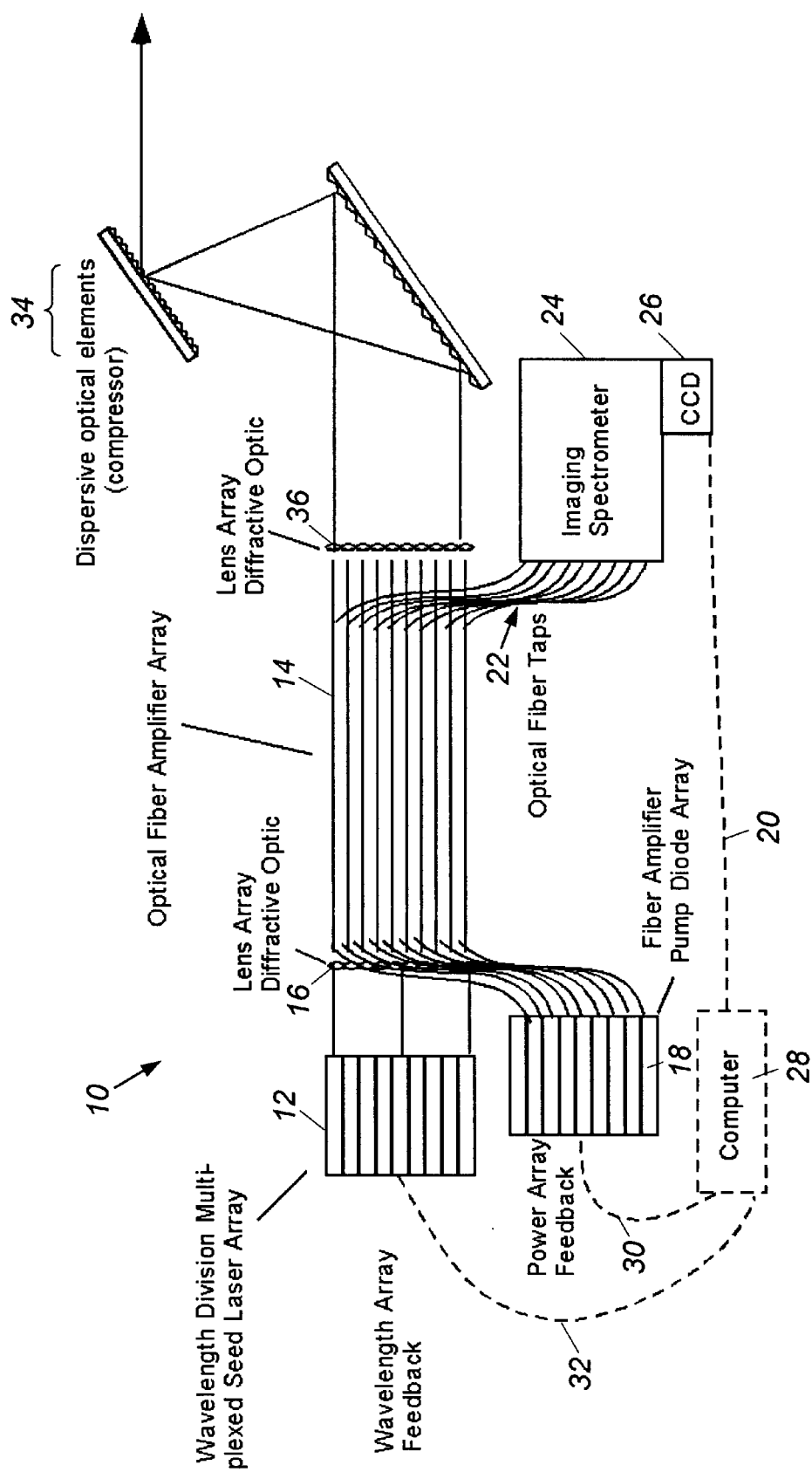
FIG. 1 is a schematic illustration of a first embodiment of the present invention in the form of a wavelength division multiplexed high power fiber array with wavelength locking and power feedback control.

Referring to FIG. 1, a first embodiment of the present invention is illustrated in the form of a wavelength division multiplexed high power fiber array with wavelength locking and power feedback control and is indicated generally at 10. The apparatus 10 includes a source of spectrally dispersed seed wavelengths in the form of a wavelength division multiplexed seed laser array 12. Each seed laser in the array 12 may consist of, for example, a Distributed Feedback (DFB) semiconductor laser. The seed laser array 12 is preferably wavelength controllable through the use of either the temperature of a Thermoelectric cooler (TEC), through the angle of an intracavity grating, current injection, phase modulation or other mechanisms which alter the index of refraction or cavity length.

An array of fibers 14 is optically coupled to the seed laser array 12 so as to receive the spectrally dispersed seed wavelengths in the individual fibers of the array 14. Each fiber in the array of fibers 14 is preferably either Yb and/or Er. A lens array 16 in the form of first diffractive optics is interposed between the seed laser array 12 and the array of fibers 14. A pump source in the form of an array of diode lasers 18 is optically coupled to the array of fibers 14 so as to amplify the sources through the array of fibers 14. That is, the output of the laser array 12 is amplified in the array of fibers 14 via pumping by the array of diode lasers 18.

A computer controlled feedback loop, generally indicated at 20, intercouples the array of fibers 14, the pump 18, and the seed laser array 12. The feedback loop 20 includes a plurality of fiber taps 22 optically coupled to the array of fibers 14 for tapping wavelengths in the individual fibers of the array 14. The loop 20 also includes an imaging spectrometer 24 with a charged coupled device (CCD) array 26 coupled thereto.

The spectrometer 24 is optically coupled to the plurality of fiber taps 22 for monitoring the wavelengths in the individual fibers of the array of fibers 14. The imaging spectrometer 24 and CCD array 26 are electrically coupled to a computer 28 of the loop 20. The computer 28 provides power array feedback through line 30 to pump 18 and wavelength array feedback through line 32 to seed laser array 12.

A compressor 34 in the form of dispersive optical elements is optically coupled to the array of fibers 14. The dispersive elements of the compressor 34 could, for example, consist of a high power dielectric grating or a photonic crystal grating. The compressor 34 receives and overlaps the wavelengths from the individual fibers of the array of fibers 14. A lens array 36 in the form of second diffractive optics is interposed between the array of fibers 14 and the compressor 34.

In operation, the wavelength of the individual fibers in the array of fibers 14 is monitored with the fiber taps 22 and the imaging spectrometer 24. The imaging spectrometer 24 and CCD array 26 provide individual fiber amplifier power monitoring so that optimal output power can be maintained from each fiber in the array 14 by ramping the diode laser pump 18. In addition, defective amplifier chains can be identified for subsequent maintenance.

The feedback loop 20, controlled by computer 28, maintains the wavelength of each individual seed laser in the seed laser array 12. The individual wavelengths are wavelength combined with a common aperture after the amplification process with the dispersive optical elements of the compressor 34. Further, non-mechanical, high-speed, beam-pointing of the combined output from the apparatus 10 can be accomplished in one axis through wavelength slewing of the seed laser array 12. This may be useful in tracking or high-speed precision machining applications.

As stated above, wavelength shifts in the apparatus 10 can be corrected either through control of index of refraction modifications of the DFB semiconductor lasers in the array 12, through spectral filtering alterations or cavity length changes. Such wavelength changes normally occur on relatively slow time scales (milliseconds) so that these feedback mechanisms have suitable bandwidths. If higher speed feedback is desired, faster feedback controls may be employed. For example, one could change the injection current into the DFB lasers of the array 12 and/or use electrically controlled opto-electronic phase modulators.

Figure 2:
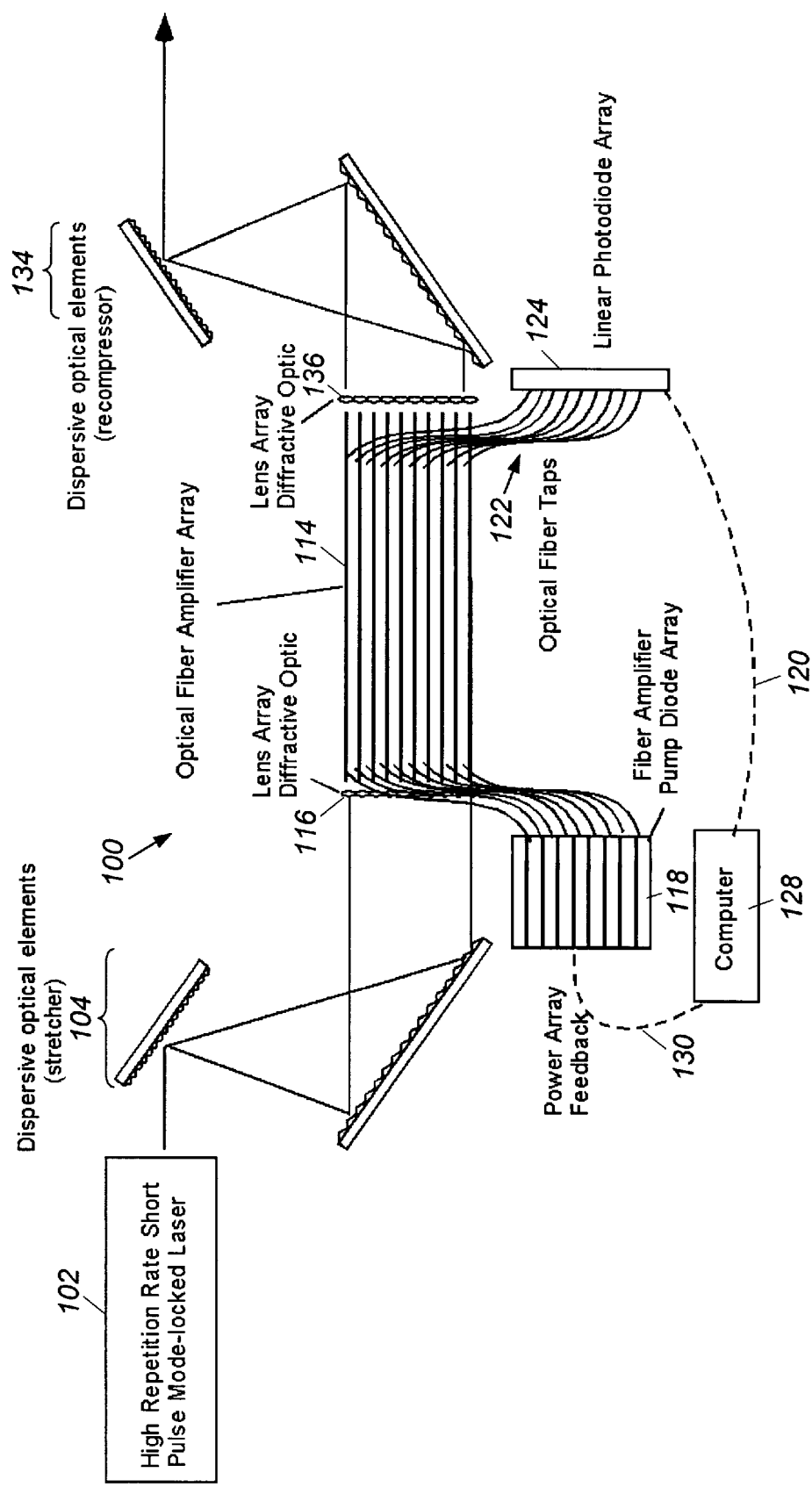
FIG. 2 is a schematic illustration of a second embodiment of the present invention in the form of a chirped pulse fiber amplifier array with power feedback.

Turning now to FIG. 2, a second embodiment of the present invention is illustrated in the form of a chirped pulse fiber amplifier array with power feedback and is indicated generally at 100. The apparatus 100 includes a source of spectrally dispersed seed wavelengths in the form of a high repetition rate mode-locked laser 102. The laser 102 may be a short pulse (femtosecond mode-locked) or broad bandwidth (amplified stimulated emission laser, frequency comb laser) source. A dispersive stretcher 104 including dispersive optical elements is optically coupled to the short pulse laser 102 so as to receive and spatially separate the frequency components of the output of the laser 102.

An array of fibers 114 is optically coupled to the stretcher 104 such that adjacent individual fibers of the array 114 receive proximal wavelength bands from the stretcher 104. The fibers of the array 114 are preferably Yb or Er. A lens array 116 in the form of first diffractive optics is interposed between the stretcher 104 and the array of fibers 114. A pump or amplifier 118 in the form of an array of diode lasers is optically coupled to the array of fibers 114 so as to amplify the output of the laser 102 and stretcher 104 through the array of fibers 114.

A computer controlled feedback loop 120 intercouples the array of fibers 114 and the pump 118 for maintaining the frequency components in the individual fibers of the array 114 to desired levels. The feedback loop 120 includes a plurality of fiber taps 122 optically coupled to the array of fibers 114 for tapping wavelengths in the individual fibers of the array of fibers 114. The loop 120 also includes a linear photodiode array 124 optically coupled to the plurality of fiber taps 122 for monitoring power levels in the individual fibers of the array of fibers 114. A computer 128 of the loop 120 is coupled to the linear photodiode array 124 for providing power array feedback through line 130 to pump 118.

A compressor 134 in the form of dispersive optical elements is optically coupled to an end of the array of fibers 114. The compressor 134 receives and realigns the frequency components from the individual fibers of the array of fibers 114 within a common aperture after the amplification process. A lens array 136 in the form of second diffractive optics is interposed between the array of fibers 114 and the compressor 134.

Figure 3:
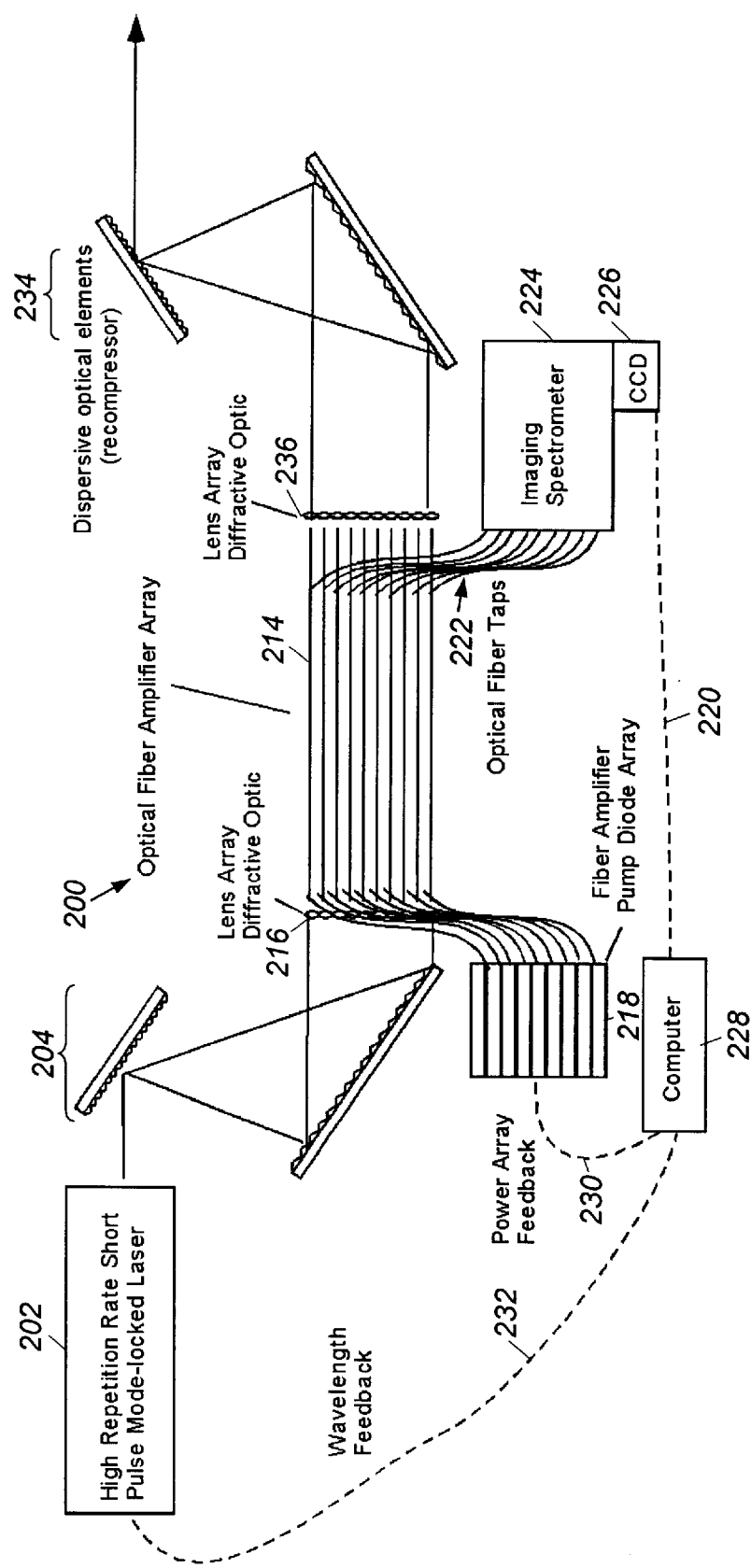
FIG. 3 is a schematic illustration of a third embodiment of the present invention in the form of a chirped pulse fiber amplifier array with power and wavelength feedback.

Referring now to FIG. 3, a third embodiment of the present invention is illustrated in the form of a chirped pulse fiber amplifier array with power and wavelength feedback and is indicated generally at 200. The apparatus 200 is identical to the apparatus 100 of FIG. 2 with minor exceptions. For example, an imaging spectrometer 224 and charged coupled device array 226 replace the linear photodiode array 124. Further, wavelength feedback is provided from the computer 228 to the laser 202 via line 232. The remaining components of apparatus 200 are identical and function the same as the components of the apparatus 100 in FIG. 2. As such, a description thereof will not be repeated here. However, these components are identified in FIG. 3 with common reference numerals increased by 100.

Referring now collectively to FIGS. 2 and 3, in operation, the short pulse or broad bandwidth optical pulse from the laser 102/202 is utilized to seed the distributed fiber amplifier array 114/214. The dispersive stretcher 104/204 spatially separates the frequency components of the short pulse with proximal wavelength bands fed into adjacent fibers (spatial channels) of the array 114/214. As such, a small section of the total frequency bandwidth from the laser 102/202 is launched into each individual fiber (or fiber section) of the array 114/214. By limiting the spectral content in each fiber of the array 114/214, the pulse is temporally broadened because of the time bandwidth relationship. This temporal broadening limits non-linear optical processes such as Raman generation and self-phase modulation.

The repetition rate of the mode locked laser 102/202 is selected to be great enough such that the chirped laser pulses therefrom temporally overlap in the fibers of the array 114/214. This minimizes non-linear interactions in the fibers of the array 114/214 that limit peak power handling, and thus maximizes average power capabilities. By suitably adjusting the repetition rate of the laser 102/202 so that the chirped pulses temporally overlap in the fiber array 114/214 (essentially producing a continuous wave beam with a well-defined phase relationship between the frequency components), the maximal amount of average power can be extracted from the fiber array 114/214.

Power tracking of each fiber in the array 114 of apparatus 100 can be accomplished with the linear photodiode array 124 so that optimal power output can be maintained and defective amplifier chains identified for subsequent maintenance. Power feedback and wavelength locking can be accomplished in the apparatus 200 with the imaging spectrometer 224 and CCD array 226. While wavelength monitoring is not necessary, it may be desirable, since shifts in the center wavelength of the mode-locked laser 202 will be automatically followed by the amplifier array 218. Further, non-mechanical, high-speed, beam-pointing of the combined output can be accomplished in one axis through wavelength slewing of the laser 202 with the wavelength tracking function.

Figure 4:
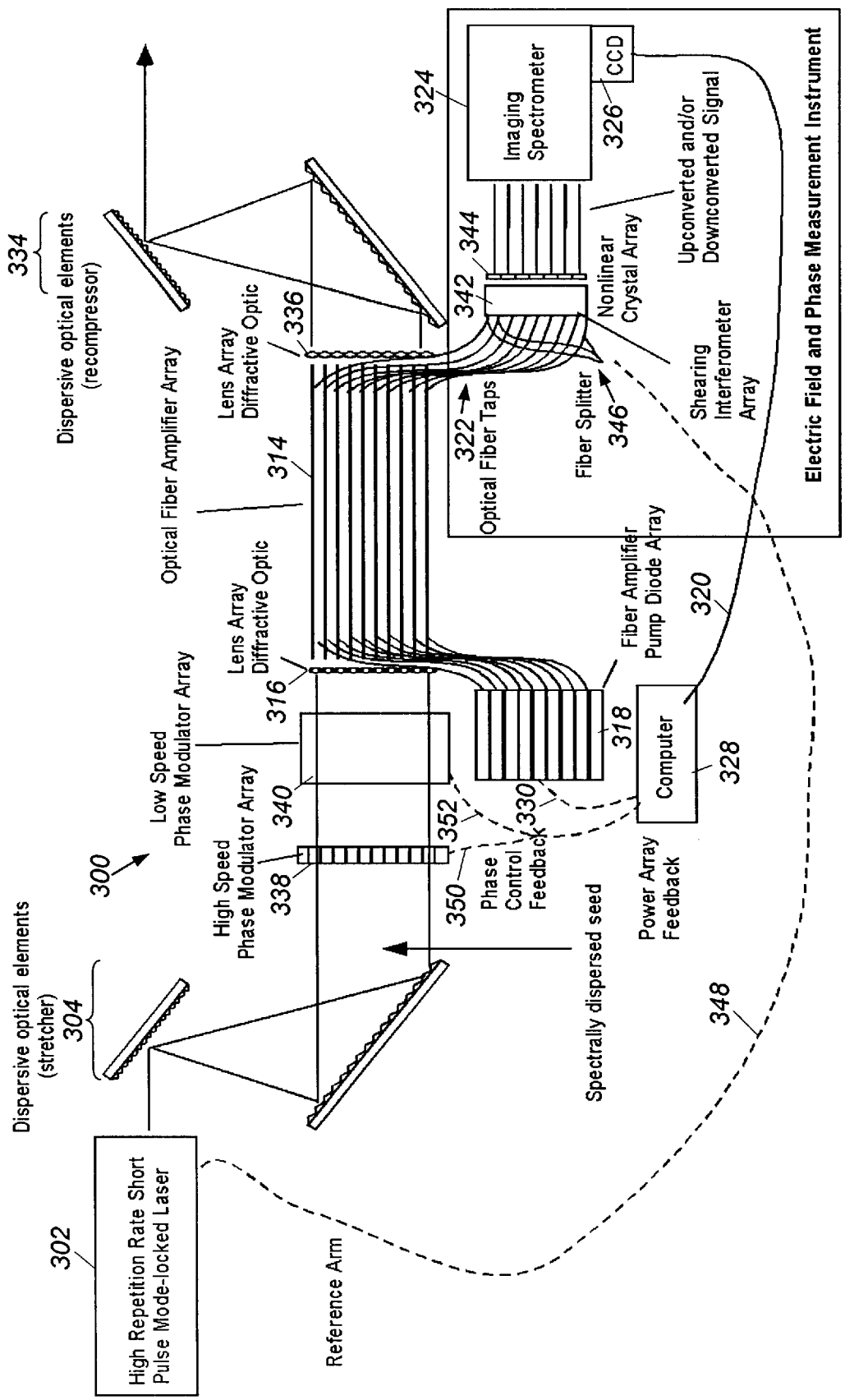
FIG. 4 is a schematic illustration of a fourth embodiment of the present invention in the form of a chirped pulse fiber amplifier array with amplitude, phase, and wavelength feedback.

Turning to FIG. 4 a fourth embodiment of the present invention is illustrated in the form of a chirped pulse fiber amplifier array with amplitude, phase, and wavelength feedback and is indicated generally at 300. The apparatus 300 includes many components identical to those employed in the second and third embodiments and a description of those components will be omitted here. However, these components are identified as being identical to previous components through the use of common reference numerals increased by 100.

In contrast to prior embodiments, the apparatus 300 includes a high-speed phase modulator array 338 and a low speed phase modulator array 340 disposed between the stretcher 304 and the array of fibers 314. Also, a shearing interferometer array 342 and a non-linear crystal array 344 are disposed between the optical fiber taps 322 and the imaging spectrometer 324. A fiber splitter 346 coupled to the shearing interferometer array 342 provides a reference signal through arm 348 to the laser 302. The computer 328 of the controlled feedback loop 320 provides phase control feedback through line 350 and line 352 to the high speed phase modulator array 338 and low-speed phase modulator array 340 respectively.

In operation, the short pulse or broad bandwidth output from the laser 302 is utilized to seed the distributed fiber amplifier array 314. The dispersive stretcher 304 spatially separates the frequency components of the output from the laser 302 with proximal wavelength bands fed into adjacent fibers of the array 314. The repetition rate of the mode-locked laser 302 is selected to be high enough such that the chirped laser pulses temporally overlap in the fibers of the array 314. This minimizes nonlinear interactions in the fibers of the array 314 that limit peak power handling, and thus maximizes average power capabilities.

Electric field and phase measurement and reconstruction techniques (for example, Frequency Resolved Optical Gating (FROG), U.S. Pat. No. 5,530,544; Temporal Analysis by Dispersing a Pair of Light E Fields (TADPOLE); and Spectral Phase Interferometry for Direct Electric Field Reconstruction (SPIDER)) are utilized to wavelength lock and phase the individual fibers of the array 314. The phase is accomplished in a feedback of loop 350/352 which drives the fast modulator array 338 (small phase compensation such as an electro-optic phase modulator) and the slow modulator array 340 (large phase compensation such as a PZT stretcher).

By implementing amplitude (i.e., power) control through the fiber amplifier pump 318, in addition to the phase and wavelength locking, synthetic optical pulse trains ranging from continuous wave to short pulse mode-locked can be generated. Such pulses can also be pre-chirped to compensate for linear dispersion, for example occurring in air, in order to generate short pulses at a specified distance from the laser source 302.

The fourth embodiment incorporates wavelength, phase, and amplitude control to provide arbitrary synthesis of optical pulse trains. Fiber taps 322 from each individual fiber of the array 314 along with a reference pulse from the original mode-locked laser 302 are utilized for electric field amplitude and phase measurement techniques. These techniques (for example, FROG, TADPOLE, and SPIDER) utilize shearing interferometer 342 and upconversion and/or downconversion in non-linear crystal 344 in order to reconstruct the electric field amplitude, wavelength and phase.

It should be noted that 2 Pi phase slips are undesirable in the phase feedback which is not the case in conventional narrow band phase locking techniques (essentially only phase slips much smaller Man the laser coherence length are desired). The phase feedback is therefore accomplished in a feedback loop 320 which drives the slow modulator array 340 and the fast modulator array 338. By implementing amplitude control (either through a spatial light modulator array or by controlling individual fiber pump levels) in addition to phase and wavelength control, locking synthetic optical pulse trains ranging from continuous wave to short pulse mode-locked can be generated. These synthesized optical pulses have utility in that different formats may be advantageous for different applications (for example, short femtosecond pulses for white light generation and absorption and fluorescence studies (stand off biological, chemical and nuclear residue detection), and picosecond (ps) pulses for metal and or semiconductor ablation (target destruction)).

Among others, the above invention has the advantage of providing a high average power, efficient, electrically driven laser source. Wavelength division multiplexing with wavelength and power control provides simple, high-power architecture utilizing telecommunications components. Wavelength control allows one axis high-speed non-mechanical steering of the laser beam. Chirped pulse systems provide a similar system where wavelength control is not necessary. Chirped pulse systems with amplitude, phase, and wavelength control allow synthetic temporal wave forms to be generated. Although the present invention will likely find usefulness in a myriad of applications, it is particularly well-suited for use in high energy laser weapons, laser tracking and illumination, laser machining, and remote sensing.

Those skilled in the art can now appreciate from the foregoing description that the broad teachings of the present invention can be implemented in a variety of forms. For example, the apparatus of the present invention may be combined with a laser sounder radar system to overcome the difficulties associated with imaging through the atmosphere. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus comprising:
   a mode-locked laser;
   a stretcher optically coupled to said laser so as to receive and spatially separate frequency components of an output of said laser to function as a source of spectrally dispersed seed wavelengths;
   an array of fibers optically coupled to said source so as to receive said spectrally dispersed seed wavelengths from said source in individual fibers of said array of fibers;
   a pump optically coupled to said array of fibers so as to amplify said wavelengths through said array of fibers;
   a feedback loop intercoupling said array of fibers and said pump for maintaining power levels in said array of fibers to desired levels; and
   a compressor optically coupled to said array of fibers so as to receive and overlap said wavelengths from said individual fibers of said array of fibers.

2. The apparatus of claim 1 further comprising:
   a phase modulator array interposed between said stretcher and said array of fibers.

3. An apparatus comprising:
   a mode-locked laser;
   a stretcher optically coupled to said laser so as to receive and spatially separate frequency components of an output of said laser;
   an array of fibers optically coupled to said stretcher, adjacent individual fibers of said array of fibers receiving proximal wavelength bands from said stretcher;
   an array of diode lasers optically coupled to said array of fibers so as to amplify said output of said laser through said array of fibers;
   a controlled feedback loop intercoupling said array of fibers and said array of diode lasers for maintaining said frequency components in said individual fibers to desired levels; and
   a compressor optically coupled to said array of fibers so as to receive and realign said frequency components from said individual fibers of said array of fibers.

4. An apparatus comprising:
   a mode-locked laser;
   a stretcher optically coupled to said laser so as to receive and spatially separate frequency components of an output of said laser;
   an array of fibers optically coupled to said stretcher, adjacent individual fibers of said array of fibers receiving proximal wavelength bands from said stretcher;
   an array of diode lasers optically coupled to said array of fibers so as to amplify said output of said laser through said array of fibers;
   a controlled feedback loop intercoupling said array of fibers and said array of diode lasers for maintaining said frequency components in said individual fibers to desired levels, said controlled feedback loop comprising:
      a plurality of fiber taps optically coupled to said array of fibers for tapping wavelengths in said individual fibers of said array of fibers; and
      a photodiode array coupled to said plurality of fiber taps and said array of diode lasers for monitoring power levels in said individual fibers of said array of fibers; and
   a compressor optically coupled to said array of fibers so as to receive and realign said frequency components from said Individual fibers of said array of fibers.

5. An apparatus comprising:
   a mode-locked laser,
   a stretcher optically coupled to said laser so as to receive and spatially separate frequency components of an output of said laser;
   an array of fibers optically coupled to said stretcher, adjacent individual fibers of said array of fibers receiving proximal wavelength bands from said stretcher;
   an array of diode lasers optically coupled to said array of fibers so as to amplify said output of said laser through said array of fibers;
   a controlled feedback loop intercoupling said array of fibers and said array of diode lasers for maintaining said frequency components in said individual fibers to desired levels, said controlled feedback loop comprising:
      a plurality of fiber taps optically coupled to said array of fibers for tapping wavelengths in said individual fibers of said array of fibers; and
      an imaging spectrometer coupled to said plurality of fiber taps, said array of diode lasers and said laser for monitoring power levels and wavelengths in said individual fibers of said array of fibers; and
   a compressor optically coupled to said array of fibers so as to receive and realign said frequency components from said individual fibers of said array of fibers.

6. The apparatus of claim 5 wherein said feedback loop further comprises:
   a shearing interferometer array and a crystal array interposed between said plurality of fiber taps and said spectrometer.

7. The apparatus of claim 6 further comprising:
   a high speed phase modulator array and a low speed phase modulator array interposed between said stretcher and said array of fibers.

8. The apparatus of claim 7 wherein said controlled feedback loop further comprises phase control feedback between said spectrometer and said high and low speed phase modulator arrays.

9. The apparatus of claim 8 further comprising wavelength control feedback between said shearing interferometer array and said laser.

* * * * *